United States Patent [19]
Hegg

[11] Patent Number: 5,748,264
[45] Date of Patent: May 5, 1998

[54] DISTORTION CORRECTED DISPLAY

[75] Inventor: Ronald G. Hegg, Vista, Calif.

[73] Assignee: Hughes Electronics, Los Angeles, Calif.

[21] Appl. No.: 370,719

[22] Filed: Jan. 10, 1995

[51] Int. Cl.$^6$ .............................. H04N 3/22; H04N 3/26
[52] U.S. Cl. .......................... 348/746; 348/747; 348/115; 345/8
[58] Field of Search .................... 348/115, 806, 348/745–747, 804, 781, 784, 832; 345/7, 8; H04N 3/22, 3/26

[56] References Cited

U.S. PATENT DOCUMENTS

| | | | |
|---|---|---|---|
| 3,446,916 | 5/1969 | Abel et al. | 348/115 |
| 3,723,805 | 3/1973 | Scarpino et al. | 315/370 |
| 3,833,300 | 9/1974 | Rymes | 348/804 |
| 4,178,074 | 12/1979 | Heller | 348/115 |
| 4,439,755 | 3/1984 | LaRussa . | |
| 4,465,347 | 8/1984 | Task et al. . | |
| 4,468,101 | 8/1984 | Ellis . | |
| 4,729,634 | 3/1988 | Raber . | |
| 4,786,966 | 11/1988 | Hanson et al. . | |
| 5,200,827 | 4/1993 | Hanson et al. . | |
| 5,299,063 | 3/1994 | Fritz et al. . | |
| 5,309,169 | 5/1994 | Lippert . | |

FOREIGN PATENT DOCUMENTS

| | | |
|---|---|---|
| 416830 | 9/1963 | Australia . |
| 0077193 | 4/1983 | European Pat. Off. . |
| 2638242 | 10/1988 | France . |
| 2644249 | 3/1989 | France . |
| 1264343 | 2/1972 | United Kingdom . |

Primary Examiner—Michael H. Lee
Attorney, Agent, or Firm—Michael W. Sales; Wanda K. Denson-Low

[57] ABSTRACT

An image-projection display (10) includes a combiner (12) which is transparent to allow a view therethrough, and which is also at least partially reflective so that an image projected onto a surface of the combiner is reflected to a viewer. The display apparatus includes off-axis projection factors so that a rectilinear projected image would be perceived by the viewer as being distorted. A projector portion (20) of the display (10) includes an image source (36, 38) and a corrector element (46), as well as means (38, 46) for physically dislocating pixel elements of a rectilinear image so that the image as projected is de-linearized with compensatory distortion causing the image viewed by the viewer to be perceived with restored rectilinearity.

33 Claims, 6 Drawing Sheets

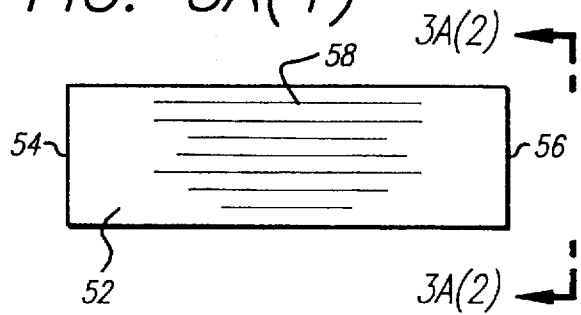
FIG. 3A(1)
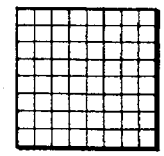
FIG. 3A(2)
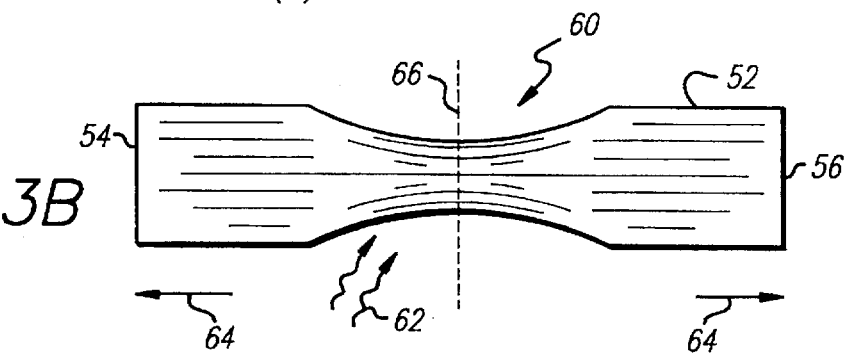
FIG. 3B
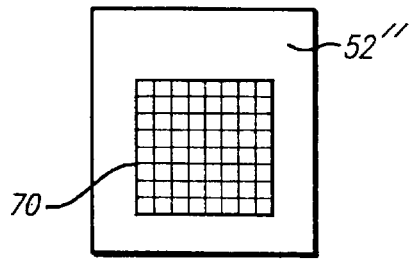
FIG. 3D(2)
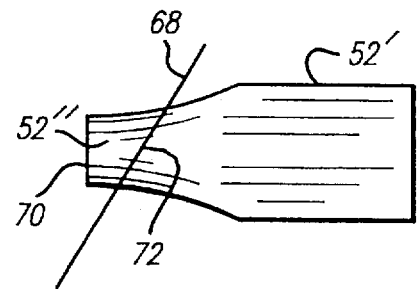
FIG. 3C
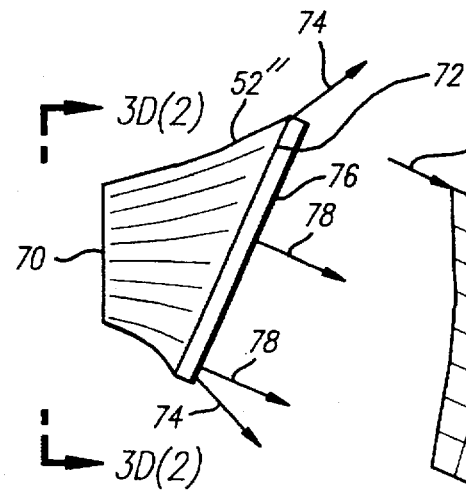
FIG. 3D(1)
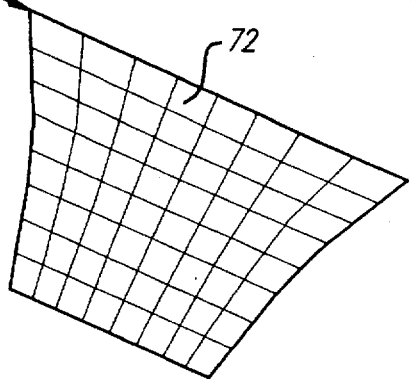
FIG. 3D(3)

DISTORTION CORRECTED DISPLAY

BACKGROUND OF THE INVENTION

1. Field of the Invention

The present invention is in the field of image-projection displays. More particularly, the present invention relates to an image-projection display which is head-mounted or helmet-mounted. Head-mounted displays may be affixed to a user's head by use of a cap or head-gear, for example. Helmet-mounted displays may also be associated with a protective helmet worn by the user of the display. In each case, the display includes a transparent and at least partially reflective combiner through which the user may see the outside world, and upon which is superimposed a projected image provided by the display. The projected image may provide an enhanced simultaneous view of the outside world, such as night vision, or may present other information to the user. Because the display moves with the user so that the displayed image information in text or graphical form, for example, may be viewed while it is superimposed upon the view of the outside world, the user is able to receive more information, or information in a combined or more timely form, than would be the case if only conventional instruments and displays were available to the user. These factors make head-mounted displays advantageous for use by aviators.

More particularly, the present invention relates to a display having an image source, projector optics, and a combiner which is both transparent so that a user of the display can see outwardly through the combiner, and reflective so that the image projected onto the combiner is reflected for viewing by the user. The combiner may be separate from or may be part of a visor configured for use with a helmet, for example. This visor may be necessary, for example, to provide wind-blast protection to an aviator. The combiner may alternatively be a wind screen of a vehicle, such as an aircraft or automobile. The projection of the image onto the combiner for viewing by the user is off-axis with respect to rectilinear relationships of the image itself. That is, the projection of the image may include geometric factors such as spherical, parabolic, conic, or trapezoidal distortions of the projected image. Accordingly the image would be distorted as viewed by the user of the display if correction to the image were not provided. However, the image source and/or projection optics of the present display provide for a selected compensatory distortion of the image so that the projected image as viewed by the user has substantially restored rectilinearity.

2. Related Technology

Conventional head-mounted displays include an image source, relay or projector optics, and a transparent and reflective combiner, all attached to or associated with a user's head. As mentioned above, the display may be secured relative to the user's head by use of a cap or head gear, or by being secured to or associated with a helmet which the user wears. With respect to such helmet-mounted displays for use by aviators, and in order to provide an aerodynamic shape for the helmet, the image source and relay optics must be integrated within the aerodynamic shell of the helmet. The aerodynamic shape is essential in case the aviator must eject from an aircraft at high speed. This requirement for aviators generally requires a custom helmet which is considerably larger, heavier, more complex and more expansive than the standard helmets. In each case where the image source and relay optics are combined into a helmet, if the visor is used as a combiner, then this visor wraps completely around the wearer's face as well as the relay optics, thereby increasing the size and weight of the helmet. On the other hand, if the helmet-mounted display system uses a separate combiner screen placed inside of a visor, then the relay optics must be more fully integrated into the helmet itself, leaving little space between the user's face and these optics. These design alternatives both lead to a helmet of increased size, weight, complexity, and cost.

In order to improve the packaging effectiveness of a head-mounted display with respect to the structure of the human head itself, attempts have been made to use off-axis projection of the image. That is, the visor or other combiner screen may be made to wrap around the face of the user so as to provide eye protection. This visor is still used as a combiner by projecting the image onto the visor inner surface for reflection to the user. This expedient causes various distortions of the image as seen by the user. Conventionally, these displays employ a cathode ray tube as the image source. In order to compensate for the image distortion introduced by the relay optics and the off-axis projection of the image, the cathode ray tube is conventionally driven by an electronic circuitry which includes distortion-correction provisions. In other words, the image produced by the cathode ray tube is compensatorily distorted so that the image seen by the user of the display has restored rectilinearity.

With such a display using a cathode ray tube as the image source, the resolution of the perceived image is not adversely affected by the initial distortion of the image at the cathode ray tube. This is the case because the cathode ray tube will still produce the same number of pixels in the image regardless of the electronically-created compensatory distortion of the cathode ray tube image. That is, if the cathode ray tube has a image of 640 by 480 pixels, the electronically distorted image will still have this same number of pixels. Thus, when the image is projected for viewing by the user of the display, the compensatory distortion will be removed by the projection, and the user will still view the image with the full 640 by 480 pixels of resolution, for example.

However, this type of conventional display has several disadvantages and limitations. First, a cathode ray tube is not a desirable image source for contemporary applications because of its inherent lack of a rugged solid state nature. In other words, the cathode ray tube image sources share all of the limitations inherent in vacuum tubes, which limitations have lead to the replacement of vacuum tubes by solid state devices in so many contemporary applications. That is, a cathode ray tube has a larger size, greater weight, larger heat generation, more limited life expectancy, and more fragile nature than do solid state devices.

Further to the above, the use of solid-state rectilinear image sources, such as active matrix liquid crystal displays (AMLCD), have been proposed for use with head-mounted displays. In order to correct the image distortion problem created by off-axis projection, it has been proposed to include an image correction scheme in the projection optics. These image correction schemes include such expedients as the use of a beam splitter positioned between the image source and the projection of the image to the combiner. The beam splitter would be used to keep the axial rays on axis and to correct the rest of the image as projected to compensate for the off-axis projection distortion. Alternatively, an off-axis corrective relay optics lens system has been proposed which would correct for the image distortion introduced by the off-axis projection. All of these proposed solutions to the problem of off-axis distortion introduce their own limitations.

For example, the light transmission efficiency of the beam splitter systems is objectionably low. Thus, the image provided by the display may be too dim for viewing under some circumstances. Alternatively, an image source having a much higher level of light projection may be required to compensate for the low optical efficiency of the optical system projecting the image. Further, the compensatory off-axis projection lens system suffers from adding weight and complexity to a head-mounted display. The added complexity adds cost and maintenance concerns, while the added weight is always objectionable to the users of such systems. Users of head-mounted displays would prefer a system so light that the user can forget it is being worn.

An example of a conventional head-mounted display is seen in U.S. Pat. No. 5,200,827; issued 6 Apr. 1993, to C. M. Hanson, et al. The Hanson patent is believed to disclose a head-mounted display in which the visor/combiner, or visor with separate combiner screen, is integrated with an image source and relay optics into a unit which may be attached to or used in association with a conventional infantry helmet. That is, the display unit may be supported by a head gear which is worn alone or under the helmet. Alternatively, the display may be attached to the wearer's helmet similarly to a flip-up visor. In each case, the display includes the visor/combiner or separate combiner screen, the image source, and relay optics all in a unit.

Consequently, the head mounted display taught by the Hanson patent suffers from many of the size, weight and complexity limitations associated conventional head-mounted displays as discussed above. A brief perusal of the Hanson patent also quickly evidences the complexity inherent with this head-mounted display.

Another conventional head-mounted aviator's display is known in accord with U.S. Pat. No. 4,468,101, issued 28 Aug. 1984 to S. M. Ellis. According to the disclosure of the Ellis patent, the head-mounted display employs an image source and relay optics carried externally of the visor of the user's helmet. A transparent and partially reflective combiner lens is suspended forwardly of the visor in the user's field of view so that an image projected by the image source and relay optics can be viewed by the user along with a view of the outside world seen through this combiner lens. With a head-mounted display according to the Ellis patent, the limited packaging effectiveness and complexity associated with an on-axis projection of the image is apparent. Also, the undesirability of having a combiner screen hanging outside of a helmet visor and subject to being bumped or caught on some obstruction during use of the display system is apparent.

SUMMARY OF THE INVENTION

In view of the deficiencies of the conventional image-projection displays, an object for the present invention is to provide an off-axis image projection display which includes compensatory distortion to a projected image so that the image perceived by a user of he display is substantially restored to rectilinearity.

An additional object for the present invention is to provide a head-mounted display having an image source providing an image, a combiner onto which the image is projected for viewing by a user, and relay optics including a corrector for providing compensatory distortion to the image so that distortion of the image resulting from any off-axis projection effects is compensated for, and the image is presented to the user in rectilinear form.

Another object for the present invention is to provide such a head-mounted display in which the corrector includes a fiber optic bundle having a plurality of individual optical fibers extending from one face to another thereof, and which is compensatorily changed in its geometry of the two opposite faces of the bundle to introduce a compensatory distortion into an image conveyed therethrough.

Still another object for the present invention is to provide a projection display apparatus having an image source providing an image, a screen upon which the image is projected for viewing by a user, and relay optics including a corrector for providing compensatory distortion to the image so that any distortion of the image resulting from off-axis effects in the projection of the image is compensated for, and the image is presented on the screen in rectilinear form.

Accordingly, the present invention provides an image-projection display which includes an image projector projecting light to form an image, and means defining an imaging surface from which at least a portion of the light is reflected to be viewed as an image by a user of the display, the display including off-axis projection factors distorting a rectilinear projected image so that the user of the display would perceive an image with distorted rectilinearity, and the projector portion providing a projected image with compensatory image distortion so that the user of the display sees an image with substantially restored rectilinearity; the image-projection display comprising: an image source for receiving a rectilinear image signal and providing a first image in response thereto; a projector optical portion for receiving the first image from the image source and for providing a second image with compensatory image distortion, the projector portion projecting the compensatorily-distorted projected image to the imaging surface with compensatory image distortion; and means for physically dislocating selected image elements (pixels) of one of the first image or the second image to compensatorily distort the projected image.

Additional objects and advantages of the present invention will be apparent from a reading of the following detailed description of a particularly preferred exemplary embodiment of the invention, taken in conjunction with the appended drawing Figures.

BRIEF DESCRIPTION OF THE DRAWINGS

In the accompanying drawings:

FIGS. 3A through 3D provides schematic illustrations of steps in the process of making a compensatory fiber optic corrector element for use in the display apparatus according to the present invention;

DETAILED DESCRIPTION OF AN EXEMPLARY PREFERRED EMBODIMENT OF THE INVENTION

Figure 1:
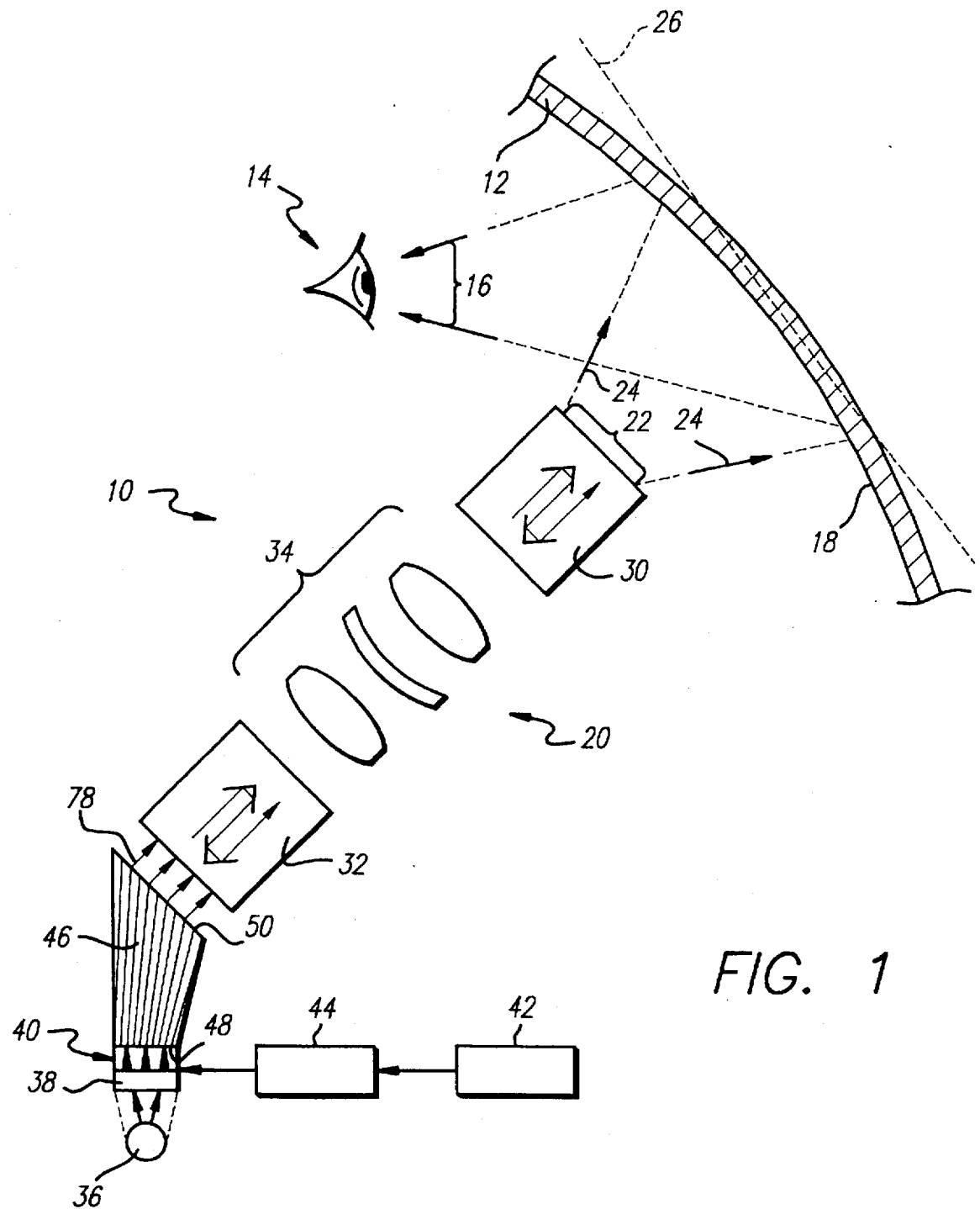
FIG. 1 presents a schematic view of a display apparatus embodying the present invention.

Viewing FIG. 1, an exemplary display apparatus 10 embodying the present invention is shown in schematic form. By way of example only and not by limitation, the display apparatus 10 may be found in an automobile, aircraft, or other vehicle (not shown), which includes a transparent windscreen or windshield 12. Behind the windshield 12 is located a driver, passenger, or other person (generally indicated by the schematic eye symbol and referenced with the numeral 14). The person 14 has a view outward through the windshield 12, and also receives an image (indicated with arrows 16) focused at infinity and reflected to the person 14 from the inner surface 18 of the windshield 12. That is, the windshield 12 is transparent so that the person 14 can see out of the vehicle, and is also somewhat reflective so that light projected onto the inner surface 18 of the windshield, as is indicated by arrows 16, is at least in part reflected to the person 14. This projected light may form an image focused at infinity so that the image appears to the person 14 to be superimposed upon the outside scene viewed through the windshield 12.

It should be understood, however, that the present invention is not limited to use with reflective surfaces which are formed by transparent materials. That is, the present invention may also be used with non-transparent reflective surfaces or display screens which are not flat. This use may arise, for example, in a cockpit flight simulator. In such a use, the interior contours of the real aircraft canopy would desirably be preserved in a virtual canopy provided with a simulated aircraft cockpit in order to preserve the overall impression for the user of the simulator that they are actually in a flying aircraft of a particular type. However, the canopy may not be transparent, and both an image representing the outside world, and an image representing overlaid graphical and textual information may be projected onto the inner surface of this virtual canopy for use in the simulator. The user of the simulator will see the image representing the outside world as it would appear if viewed through a real transparent canopy of an aircraft, and will also see the overlaid information which the user of the real aircraft would see superimposed on the real world. Accordingly, the invention can also be used in virtual reality and training apparatus, for example, with a reflective surface which is not transparent presenting the projected image to a user.

In the present embodiment of the invention, the windshield 12 may be referred to as a transparent and partially reflective combiner for the apparatus 10. That is, the light transmission and light reflection qualities of the windshield result in the view of the outside scene being combined with the projected image for the person 14. As is seen in the schematic illustration of FIG. 1, the windshield 12 may have a shape and character other than a flat or planar sheet of glass or plastic, for example. That is, the windshield (combiner) may be curved in one or more planes so that the combiner has a lensing effect on the projection of image 16 in the apparatus 10. As illustrated in FIG. 1, the lensing effect of the windshield 12 would be that of a concave magnifying mirror. Also, the projected image may be distorted by angularity effects as is also illustrated in FIG. 1.

In order to visualize the effects of this type of angularity an example may be taken from the use of an overhead projector. When the image from such a projector is projected high up on a screen so that all in a crowded room, for example, can see the image, then this image takes on a trapezoidal projection distortion. Only when the center of the projected image is at the level of the projection head of the overhead projector can such a distortion of the projected image be avoided. Another type of projection distortion is seen in OmniMax theaters which us a semi-spherical screen on which an image is projected for viewing by an audience. In these theaters, a specialized correction lens set is used to compensate the image for spherical and other projection distortions so that an essentially rectilinear image is presented to the audience.

In addition to the distortion or lensing effect on the image 16 resulting from any curvatures or shape factors of the combiner (windshield) 12, FIG. 1 shows that the image 16 originates with a projector, generally referenced with the numeral 20. The projector 20 includes a projection window or optical aperture, indicated at 22, from which a cone of projected light (indicated with arrowed numeral 24) travels to the inner surface 18 of the combiner 12 for reflection to the person 14. As is apparent from FIG. 1, the projected image 24 has a divergent cone shape between aperture 22 and the surface 18. If a flat screen, such as a movie screen, were placed at the location of the inner surface 18, and were arbitrarily angulated to be tangent to any particular point of the surface 18 (as is indicated by the dashed line 26), it would be seen that the image 24 on this screen is everywhere un-focused, and is also distorted by the geometry of the projection of the image 24. In other words, the image seen by the person 14 is subject to distortion by shape factors associated with the combiner 12, and by factors associated with the projection geometry of the combiner 12 relative to the projector 20 and person 14. The projection geometry as depicted may be referred to as an off-axis geometry because it does not preserve rectilinearity of the projected image.

Figure 2A:
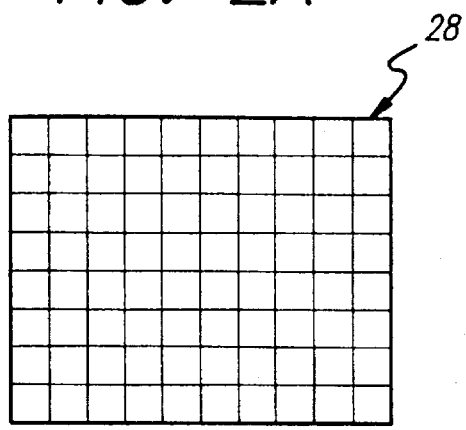
FIGS. 2A through 2D present respective geometric representations of a rectilinear image field, an image field distorted by an exemplary combination of conic section and slant projection (trapezoidal distortion), an image field distorted according to a first order trapezoidal function or slant projection, and an image field distorted according to an arcuate function or cylindrical projection.

In order to further explain the above, FIG. 2A presents a rectilinear image field 28. This image field is composed of straight lines which intersect with one another at 90 degree angles. If the image 16 perceived by the person 14 as being focused at infinity and superimposed upon the outside scene were the same as rectilinear image field 28, it is apparent that the image projected from the projector 20 would have to be considerably different because of the shape factors and projection distortions effective in the apparatus 10. It will be understood that the rectilinear image field 28 is used as an example only. Any equivalent image could be used to illustrate the relationship between the image perceived by the person 14 and the image projected by projector 20. However, the use of the rectilinear image field make a understanding image distortion and compensation factors easier. Those ordinarily skilled in the pertinent arts will understand that if a rectilinear image is provided by the display apparatus to the user 14, other images will similarly be provided to the user 14 with their rectilinearity preserved or substantially restored.

Viewing FIG. 1 again, it is seen that the projector 20 includes a pair of folding prisms 30, 32, which are used to increase the length of the optical path within the projector 20 without a commensurate increase in the external physical size of this projector. Projector 20 also includes a set of field projection lenses 34. Importantly, the projector 20 includes as part of an image source, a light source 36 located behind a active matrix liquid crystal display (AMLCD) screen 38. That is, the AMLCD screen 38 is a back-lighted screen so that if this display were viewed directly, a light-emitting image could be viewed. However, for the present invention, the screen 38 is also de-linearized. That is, this image produced at display screen 38 is distorted in a selected way. FIG. 2D represents an exemplary image 40 at it would appear at screen 38 if viewed directly. The image 40 is a representation of a rectilinear image like image field 28 which is distorted to partially compensate for distortions inherent in the apparatus 10. As is seen in FIG. 2D, the image 40 is linear with respect to vertical lines, but is de-linearized and is arcuate with respect to horizontal lines in the image. Other types of physical de-linearizations can be introduced into a rectilinear image at the screen 38, as will be seen from the following explanation. That is, for example, the image at screen 38 could be de-linearized in a serpentine rather than arcuate configuration.

At this point it is important to recognize that the de-linearized image at screen 38 is not equivalent to that resulting from either the electronic manipulation of an image as is conventionally done with a cathode ray tube image source, nor to electronic image morphing which may be conventionally done with image manipulation software and a fast graphics engine on a computer system driving into a liquid crystal display. As mentioned above, the cathode ray tube retains its resolution even when the image is electronically manipulated. This retention of resolution in not easily accomplished with a solid state image source, however. That is, image morphing results in some parts of the image being expanded or stretched, while other parts of the image are compressed or shrunken. With an image having the same resolution (640 by 480 pixels, for example) as the display device on which it is to appear, in some cases an image pixel will spread over adjacent display pixels, and the morphing process will assign a compromise gray-scale value to these display pixels. This spread of image pixels and compromise assignment of image tone causes a loss of resolution.

In other cases, two or more image pixels will shrink into one display pixel, and the morphing process will again assign this pixel of the display a compromise value representative of all the image pixels shrunken into the particular display pixel. Again, a loss of image resolution results. Additionally, the morphed image will almost certainly no longer match the shape of the rectangular array of pixels (640 by 480, for example) in the display device so that the morphing processor has to adjust the relative size of the display image to fit on the array of pixels available in the display device (the AMLCD, for example). As a result, some pixels of the display device may not be driven at all because the display image as reduced to fit within the bounds of the display device leaves some of the pixels unused. Again, a loss of image resolution results. This loss of image resolution is minimized or completely absent from the present image-projection display system, as will be further explained. On the other hand, the screen 38 itself retains all of the original image resolution because the pixel locations are shifted physically to compensate for at least part of at least one of the distortion factors effective in the apparatus 10.

Screen 38 may be a rectangular AMLCD upon which the pixels are arranged in a non-linear pattern. As depicted in FIG. 2D without limitation, the pattern of the pixels of the screen 38 may be curved or arcuate, for example. The screen 38 receives an image signal from a signal generator 42 via a signal conditioning circuit 44. The signal conditioning circuit 44 may be selected similarly to conventional distortion compensation circuitry presently used to drive cathode ray tube image sources to introduce a certain compensatory distortion into the resulting image, or may be a version of a digital image morphing processor. To the extent that the electronic compensatory image distortion effected by circuit 44 is used to compensate the image for distortions of the apparatus 10, it is understood that a certain loss of resolution may result, as was explained above. However, this loss of resolution may be minor and acceptable because of other aspects of the present invention preserve image resolution.

For example, in the present case, the circuit 44 may be configured to introduce a minor additional non-linearity into horizontal line elements of the image 40. The major non-linearity of these line elements is seen in the curved or arcuate shape of the horizontal pixel rows, as discussed above. To this major non-linearity, an additional non-linearity is achieved, by way of example only, by a center-biased pixel shifting. That is pixels near the center of the image are shifted one or more display pixel positions downwardly from the location where they would otherwise appear. This shifting of pixels would introduce a horizontal "waviness" distortion factor into the projected image. This pixel shifting is depicted on FIG. 2D by the shading of pixel columns with the upper one or two display pixels being left blank to indicate that the upper one or two pixels, for example, are not driven with image information. Thus, center columns of pixels are shifted selectively downwardly and it is seen that some pixels are lost from the bottom center of the image. Accordingly, a small amount of image resolution is lost.

However, the major compensatory image distortion factor evident at the display 38 is the arcuate physical dislocation of the display pixels. The whole display 38 is arcuate to provide a compensatory distortion of the image produced with little or no electronic image manipulation and loss of image resolution. Alternatively, the screen 38 may itself be configured so that pixel columns are arcuate or bowed, while the pixel rows of this display screen are straight. Other compensatory physical dislocations of the pixels of the screen 38 are possible in order to partially or fully correct for one or more of the distortion factors of the display apparatus 10. It will be understood in view of the above, that the image source of the apparatus 10 (that is, at screen 38), is selectively distorted by one or both of electronic manipulation of an image signal or by physical dislocation of the pixel elements of the image source so that a rectilinear image signal like field 28 produces a selectively distorted image, like image 40 for example.

. Interposed in the projector 20 as an additional element of the image source and located between the screen 38 and the folding prism 32 is a fiber optic corrector element 46. This corrector element has one end 48 associated with the AMLCD screen 38 so as to receive the light-emitting image provided by the screen 38. At an opposite end 50, the fiber optic corrector element 46 presents the image with an additional compensatory distortion factor, as will be explained. That is, pixels of the image presented at surface 50 are additionally displaced physically to introduce an additional selected distortion into the image projected by the projector 20. As those who are ordinarily skilled in the pertinent arts will recognize, the fiber optic element 46 includes a great multitude of optical fibers extending between the opposite ends 48 and 50. By way of example, a typical AMLCD of approximately one inch on a side may have an array of pixels which is 640 by 480 (i.e., approximately 307 thousand pixels). On the other hand, a typical fiber optic bundle may be made of optical fibers of approximately 10 micron diameter (0.01 mm).

Accordingly, it is seen that each pixel of the display screen 38 will be over-sampled, for example, by ten, twelve, or more of the optical fibers in the element 46. Thus, it is apparent that the corrector element 46 has a very large optical aperture, and a high efficiency of light transmission in the projector 20. At the end 48, the element 46 may be configured to be rectangular like the screen 38, and to also be rectilinear like the image of FIG. 2A. That is, at the end 48, the individual fibers of the element 46 would be arranged in regular rows and columns, for example, or in some other regular geometric pattern such as a hexagonal array. However, at the end 50, the fibers of the element 46 are arranged in a pattern as is schematically indicated in FIG. 2C. That is, a trapezoidal distortion has been effected on the array of optical fibers of the element 46 so that a rectilinear image presented at surface 48 would be presented at surface 50 as is seen in FIG. 2C. It should be noted in FIG. 2C that rows and columns of the image are both still straight, but that lines no longer intersect perpendicularly.

Figure 2B:
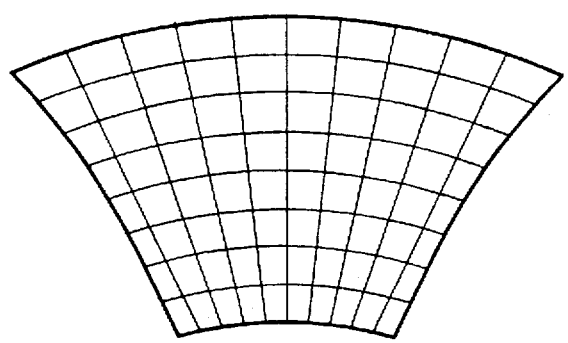
Figure 2C:
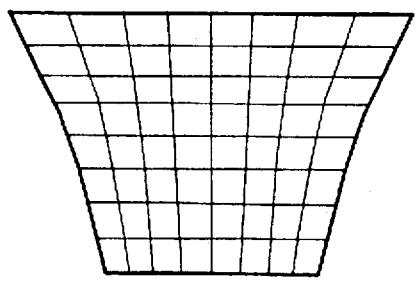
Figure 2D:
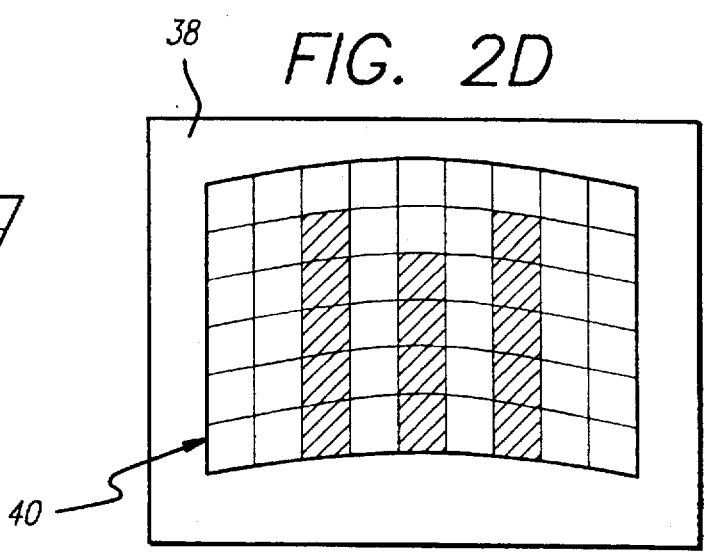

FIG. 2B presents a schematic and graphical representation of the image presented at surface 50 of corrector element 46 by the superposition of the de-linearized physical dislocation of pixel positions and resulting arcuate shape of the image at display 38 along with the trapezoidal compensatory distortion effected by the corrector element 46. Viewing FIG. 2B, it is seen that the resulting image includes compensatory distortion elements of arcuate distortion of pixel rows, and trapezoidal distortion of pixel columns. Additionally, any pixel shifting (image morphing) which is electronically effected at the screen 38 by operation of the circuit 44 would also appear at the image of FIG. 2B. The image of FIG. 2B is delivered by corrector element 46 to the folding prism 32 for projection through the lenses 34 and prism 30 onto combiner screen 12. As explained, the image projected onto combiner 12 is in part reflected to the person 14 for viewing along with a view outwardly through the combiner 12.

Considering now FIGS. 3A through 3D, steps in the process of making an exemplary fiber optic corrector element 46 are set out. The process of making the corrector element 46 includes the provision of an elongate fiber optic work piece 52. This work piece 52 includes a great multitude of elongate and mutually interbonded glass optical fibers extending from one end 54 to the opposite end 56 of the work piece 52, as is indicated by the lines on the work piece 52 referenced with the arrow 58. A right-hand portion of FIG. 3A (i.e., FIG. 3 A(2)) provides an end view of the work piece 52, and of the multitude of optical fibers on the end 56.

FIG. 3B indicates that a central portion 60 of the work piece 52 is heated, as is indicated by the arrows 62, to partially soften this portion of the work piece 52. While the portion 60 is heated to a controlled temperature, work piece 52 is elongated, as is indicated by arrows 64. The elongation of work piece 52 results in the portion 60 necking down to an hourglass shape as is seen in FIG. 3B. The individuality of the optical fibers in the work piece 52 is not compromised by this heating and drawing operation. After the work piece 52 is cooled, it is cut and polished at the line indicated by the numeral 66, to produce a work piece 52'.

FIG. 3C indicates that the resulting work piece 52' is again cut and polished at the line indicated with the numeral 68 to produce a work piece 52". Work piece 52" is seen in FIG. 3D, and includes opposite end surfaces 70 and 72. Respective left-end and right-end portions of FIG. 3D (i.e., FIG. 3D(2) and 3D(3)) indicate that the surface 70 is rectangular, and preserves rectilinear arrangement of the array of optical fibers 58. On the other hand, the surface 72 is trapezoidal in shape when viewed in projection perpendicular to this surface. The optical fibers defining the surface 72 have a trapezoidal relative arrangement. It will be understood that the rectangular grid on FIG. 3D(2) and the trapezoidally distorted grid on the right-hand portion of this Figure, 3D(3) are not a feature of the structure depicted, but are placed on these drawing Figures in order to assist in schematically illustrating the geometries of the array of optical fibers of the work piece 52" in their relative positions to one another. If an observer were to actually view the surfaces 70 and 72, the grid lines would not be present and the relative positions of the arrayed optical fibers would be impossible to determine to the casual observer because of their extremely small size.

However, it will be noted viewing FIG. 3D that the optical fibers which define the surface 72 intersect with this surface at various angles across the extent of this surface. In addition to the predominant transmission of light within an optical fiber along the axis of the fiber (light intensity ordinarily has a bell-shaped distribution curve with highest intensity on the optical axis of the fiber core), the intersection of the axes of the fibers with surface 72 results in a "prism" effect so that most of the light from surface 72 would have directions like that indicated by arrows 74. In other words, the angularity of the emerging light would have a greater angle to the surface 72 according to the angle of the respective fibers the ends of which define this surface. Understandably, this direction of the light from corrector element 46 (from which it is desired to form an image) is not desirable.

Accordingly, a diffusion layer or treatment, as is indicated by numeral 76, is applied to the surface 72. The diffusion layer 76 may be made of a translucent paint applied to the surface 72, or a thin layer of translucent glass (such as milk glass) may be bonded to the surface 72, for example. Alternatively, the surface 72 may itself be made to diffuse light arriving at this surface via the optical fibers by etching or grit blasting this surface to form a roughened and translucent diffusion layer of the glass of the fibers 58 themselves. As a result of the diffusion layer or treatment 76, the image arriving at surface 72 via the fibers 58 is still preserved, but the direction of projection of the image light from surface 72 acquires a distribution most predominant along the perpendicular direction (arrow 78) to the surface 72. The work piece 52" is used when completed as the connector element 46, with surface 70 being disposed at end 48 and surface 50 being defined by the diffusion coating or treatment 76.

Returning now to further consideration of FIG. 1, it is seen that the image light (arrows 74) from surface 72 of corrector element 46 is received by the prism 32 for transmission through the remainder of the projector 20 and onto the combiner 12. It should be noted that the spacing shown in FIG. 1 between the corrector element 46 and the folding prism 32 is a feature of the schematic illustration of the apparatus 10 and not of a physical embodiment of the apparatus. Preferably, the folding prism 32 will be placed extremely close to or in contact with the corrector 46 to receive as much as is possible of the image light emerging from this corrector element. Because the de-linearized screen 38 and the trapezoidally distorted corrector element 46 in combination provide a compensatory distortion of the projected image, as is illustrated in FIG. 2B, the user 14 sees the image after projection onto the surface 18 and reflection to the user, with restored rectilinearity, as is indicated in FIG. 2A. Because the fiber optic corrector element 46 has a large optical aperture and is actually placed very close to or in contact with the surface 72 (or in contact with the diffusion coating 76 on this surface), the corrector 46 captures a large part of the image light transmitted toward this corrector 46. This light is projected onto the combiner 12, to result in the display apparatus 10 having a much brighter and more visible image than could be provided by conventional displays with an equivalent level of light input from the image source (i.e., from light 36 and AMLCD screen 38).

Figure 4A:
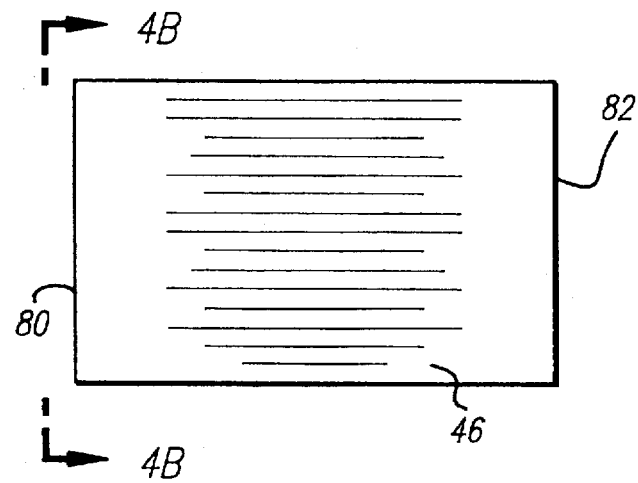
FIGS. 4–7 present schematic representations of alternative configurations of a fiber optic corrector element for use in an image-projection display according to the present invention.
Figure 4B:
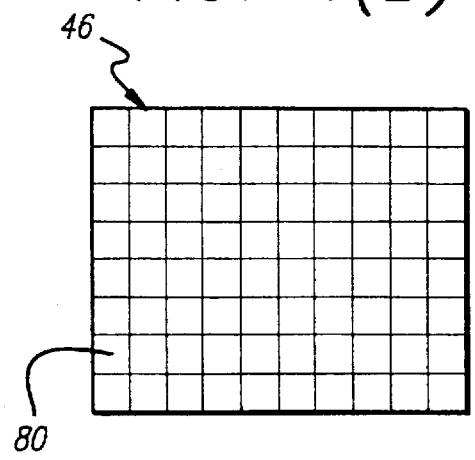
Figure 4C:
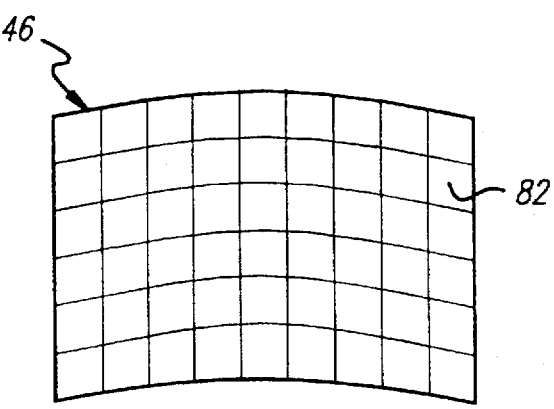

It will be understood that the above is merely an example of the present invention, and that the compensatory distortions for shape, projection, and other factors having to do with the projector 20 and the context within which apparatus 10 is used may be other than the illustrated trapezoidal and curvilinear corrections discussed in reference to FIG. 2. FIGS. 4–7 provide examples of other correction factors, for example, which can be effected with the corrector element 46. FIG. 4 shows that the corrector element 46 may have a rectangular and rectilinear face 80 at one end and a curvilinear face 82 at the opposite end. In this case, a curvilinear correction at the screen 38 like that discussed above would not be necessary because the corrector element 46 would provide that part of the compensatory image distortion. The screen 38 could than be distorted on some other way in order to achieve the total compensatory distortion needed for the apparatus 10, recalling that the compensatory distortions are additive by superposition through the projector 20.

Figure 5:
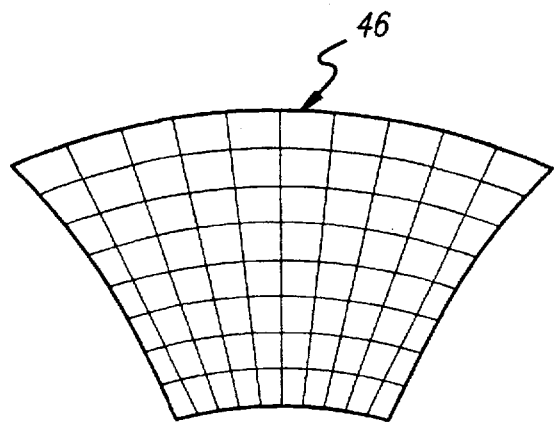

FIG. 5 shows that the corrector element 46 may be configured to provide both a curvilinear (along horizontal lines, as depicted) and a trapezoidal compensatory distortion. With this configuration of corrector element, a rectilinear input to the corrector element 46 would directly provide an image distorted as illustrated in FIG. 2B. Thus, the screen 38 could be rectilinear, or could be distorted by physical dislocation of image pixels in other ways in order to achieve a compensatory image distortion by superposition which matched that required by the particulars of the environment of use of the apparatus 10. It will be recalled that the image presented on the screen 38 can in all cases be electronically morphed, or pixel shifted, as explained above. However, in order to avoid loss of image resolution it is desired to provide the compensatory image distortion required for a particular application of apparatus 10 in its use environment by means of selecting the configuration of the image source AMLCD screen 38, and of the fiber optic corrector element 46. Image morphing can then be used not at all, or only in a limited way as described above because of the undesirable loss of image resolution resulting from such image morphing.

Figure 6B:
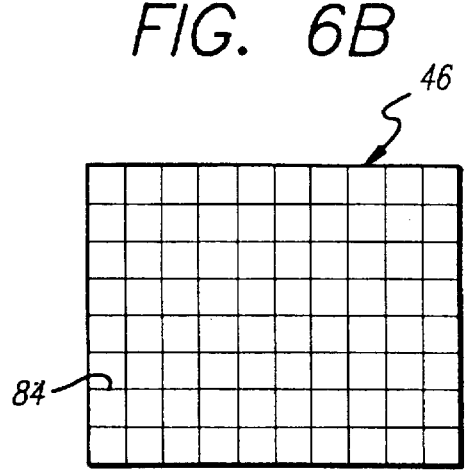
Figure 6A:
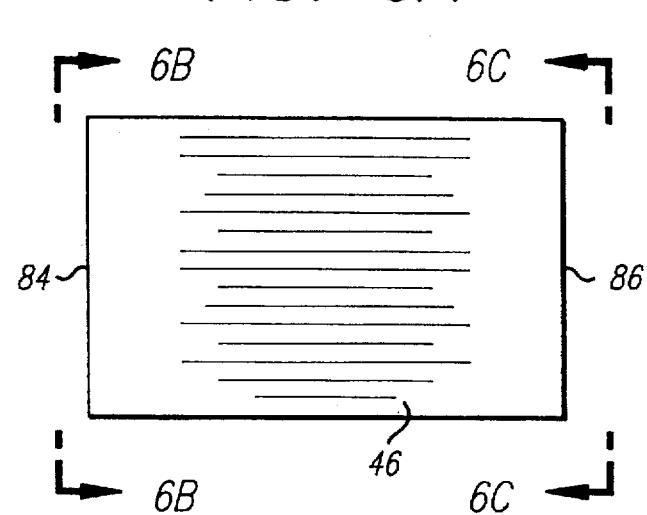
Figure 6C:
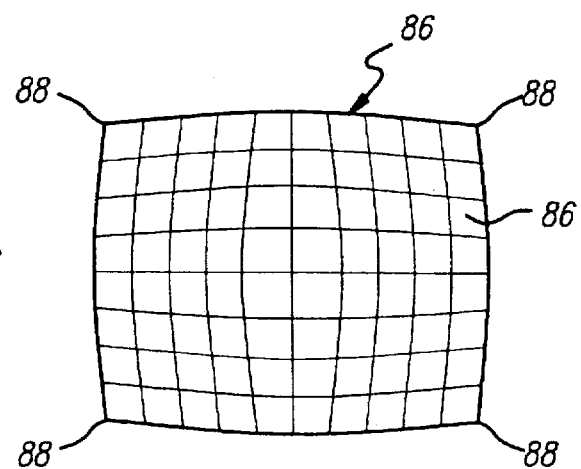

FIG. 6 shows another example of a corrector element 46, which in this instance has a rectangular and a rectilinear face 84 at one end, and a two-dimensionally curvilinear face 86 at the other end. The two-dimensionally curvilinear face 86 has cusps 88 at the intersection of the curved sides of the face. All of the rows and columns of this corrector element face are curved, (or the array of fibers on this face is equivalently arranged if not in rows and columns), and all of the lines intersect at angles other than perpendicular (except at the geometric center of the face).

Figure 7:
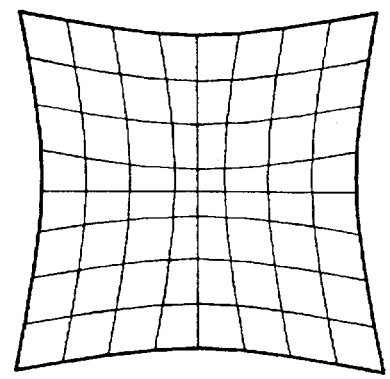

It will be recognized that the corrector elements 46 illustrated in FIGS. 4–6 do not have their faces relatively angulated like the corrector element of FIG. 3. However, all corrector elements can also include this aspect of relative angulation of the opposite faces of the element in order to achieve a selected compensatory image distortion, as was discussed above by reference to FIG. 3. Additionally, dependent upon the relative angulation of the face at which light exits the corrector element 46, and the presence or absence of the "prism" effect discussed above, the translucent diffusion coating or treatment may or may not be needed at the light output face of the corrector element 46. Further, the direction of light transmission through the corrector elements 46 can be in either direction. FIG. 7 illustrates that if a rectilinear image (like that of FIG. 2A is applied to the curvilinear face 86 of a corrector element 46 like that shown in FIG. 6, then the image at the opposite face 84 of the corrector element will be compensatorily distorted as shown in FIG. 7.

In view of the above, it is seen that the apparatus 10 projects an image to a viewer which is off-axis. That is, the rectilinearity of a rectilinear image would be destroyed by the projector so that the image seen by the viewer would be distorted. However, by use of a selectively and compensatorily distorted image source, or a selectively and compensatorily distorted fiber optic corrector element, or both, the projected image is compensatorily distorted so that the viewer sees an image with substantially restored rectilinearity. When both a distorted image source and a fiber optic corrector element are used together, the compensatory distortions provided by each are additive by super position, as described above. Additionally, image morphing can be used with the present apparatus if necessary to provide a substantially rectilinear image for the user of the display while recognizing that such morphing has a price in image resolution.

Figure 8:
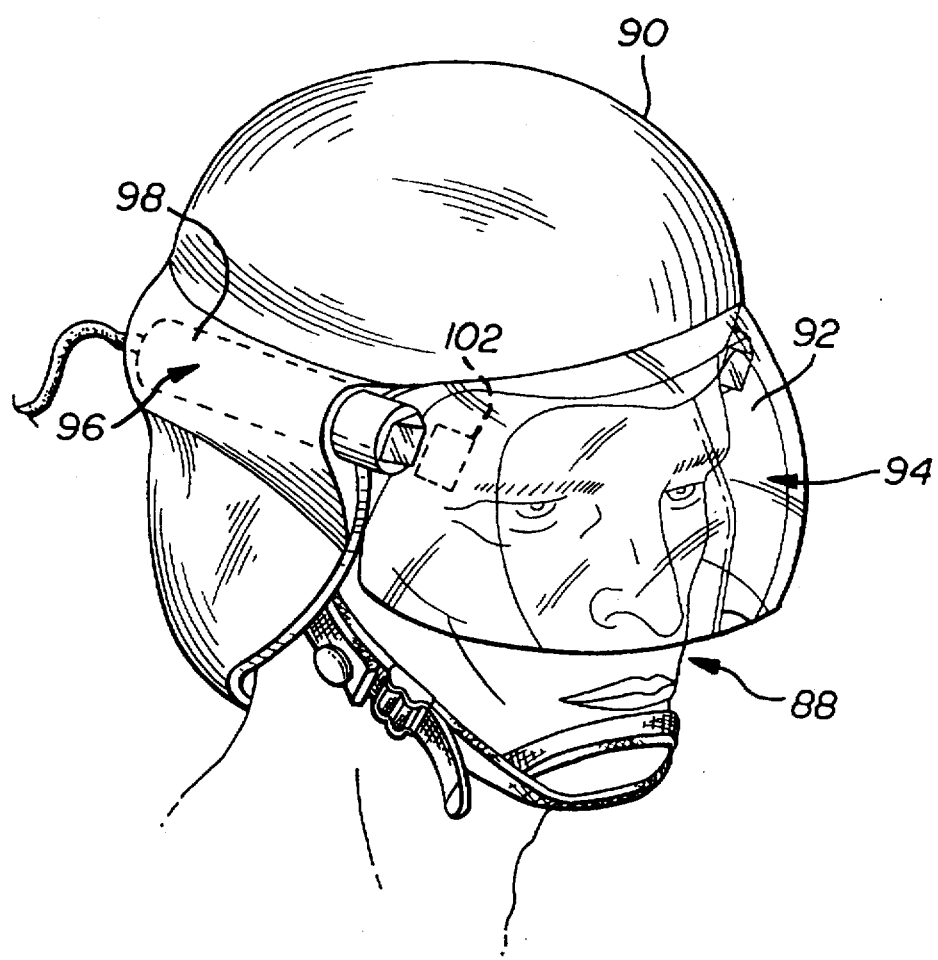
FIG. 8 provides a perspective view of a user wearing a helmet incorporating the present invention to project an image onto a visor/combiner of the helmet for viewing by the wearer of the helmet.

FIG. 8 illustrates a particularly preferred embodiment of the present invention in which a user 88 is wearing an essentially standard aviator's flight helmet 90. Secured to the flight helmet 90 in place of the standard visor is a transparent visor/combiner module 92 according to the present invention. The visor combiner module 92 includes a curved viewing area, generally indicated with the numeral 94. This curved viewing area 94 would distort a rectilinear image projected thereon, similarly to the distortion explained with reference to FIG. 1.

Removably attached to the helmet 90 in a temporal position is a projector module, indicated with the number 96. The visor/combiner module 92 and projector module 96 together make up an off-axis image projection apparatus 10 like that described above. However, in this instance, the apparatus is particularly adapted to be mounted on the head of the user 88. The projector module 96 includes a protective conformal housing 98 which carries an image source (light 36 and AMLCD screen 38, for example), a fiber optic corrector element 46, and projection optics (folding prisms 30, 32, and lens set 34, for example). The housing 98 is preferably removably attached to the helmet 90. The image source receives power and image signals via a cable 100 extending from the housing 98 to, for example, image source and conditioning circuits (42, 44) like those described above.

As is further depicted in FIG. 8, the projector module 96 provides an image to the user 88 which is projected through a peripheral window portion 102 of the visor combiner module 92. This projection of the image through the peripheral window portion 102 of the visor/combiner imparts one of the distortion factors which must be taken into account in the depicted use environment of the apparatus 10. It will be understood that the helmet 12 may carry a right-hand module 96, a left-hand module 96, or both.

An advantage of the present invention resides in its ability to be used with an essentially standard aviator's helmet, and to avoid the necessity for large, complex, and expensive helmets with built in head-mounted displays. A further advantage of the present invention resides in its adaptability to great variety of use environments in which an image projection display may be used. Such uses are particularly facilitated by the ability of the invention to compensate for off-axis projections of the image which distorts rectilinearity of the image as seen by the viewer. The apparatus is usable to receive a rectilinear image signal for an image having plural image elements, or pixels, and to selectively dislocated pixels of the image to de-linearize a projected image with compensatory distortion so that an image viewed by a user of the display is perceived with restored rectilinearity.

While the present invention has been depicted and described by reference to several particularly preferred exemplary embodiments of the invention, such references do not imply a limitation on the invention, and no such limitation is to be inferred. The invention is limited only by the spirit and scope of the following claims, which also provide a definition of the invention, giving full cognizance to equivalents in all respects.

What is claimed is:

1. An image-projection display which includes an image projector projecting light to form an image, and means defining an imaging surface from which at least a portion of said light is reflected to be viewed as an image by a user of the display, said display including off-axis projection factors distorting a rectilinear projected image so that the user of the display would perceive an image with distorted rectilinearity, and the projector portion providing a projected image with compensatory image distortion so that the user of the display sees an image with substantially restored rectilinearity, said image-projection display comprising:

an image source for receiving a rectilinear image signal and providing a first image in response thereto;

a projector optical portion for receiving said first image from said image source and for providing a second image with said compensatory image distortion, said projector portion projecting said compensatorily-distorted second image to said imaging surface;

means for physically dislocating selected image elements (pixels) of one of said first image or said second image to compensatorily distort said second image, wherein said means for physically dislocating selected image pixels includes said image source having a fiber optic corrector element with a multitude of optical fibers extending therethrough and cooperatively defining opposite faces of said corrector element.

2. The image-projection display of claim 1 wherein said means for physically dislocating selected image pixels includes said image source having a physical configuration which is at least partially non-linear so that said rectilinear image signal provides a non-rectilinear first image on said image source.

3. The image-projection display of claim 2 wherein said image source includes a solid state image screen having a fixed number and location of pixel elements.

4. The image-projection display of claim 3 wherein said solid state image screen has said pixel elements arranged in rows and columns.

5. The image-projection display of claim 4 wherein said solid state image screen has a physical configuration which is at least partially non-linear and having an arcuate shape for one of the rows or columns of pixels of said image source.

6. The image-projection display of claim 1 wherein said fiber optic corrector element includes a face which is rectilinear with respect to the arrangement of the multiple optical fibers defining said face, and an opposite face which is non-rectilinear with respect to the arrangement of the multiple optical fibers defining said opposite face.

7. The image-projection display of claim 1 wherein said fiber optic corrector element includes a pair of opposite faces each receiving respective ends of the multitude of optical fibers, one face of said pair of opposite faces having a selected arrangement of said multitude of optical fibers, and the other face of said pair of opposite faces having a selectively different pattern of said multitude of optical fibers so that pixel image elements are selectively dislocated between said pair of opposite faces.

8. The image-projection display of claim 6 wherein said fiber optic corrector element includes said opposite face having an arcuate arrangement along a selected axis of said multitude of optical fibers.

9. The image-projection display of claim 6 wherein said fiber optic corrector element includes said opposite face having a trapezoidal arrangement of said multitude of optical fibers.

10. The image-projection display of claim 6 wherein said fiber optic corrector element includes said opposite face having an arcuate arrangement of said multitude of optical fibers along two perpendicularly arranged axis.

11. The image-projection display of claim 10 wherein said fiber optic corrector element includes said opposite face having two pairs of opposite side edges, at least one pair of which is arcuate, and said side edges intersecting to define cusps for said opposite face of said corrector element.

12. The image-projection display of claim 11 wherein said fiber optic corrector element includes both pairs of said opposite face having a pair of arcuate opposite side edges, and the side edges of said pairs of opposite faces intersecting to define cusps for said opposite face.

13. The image-projection display of claim 1 wherein said projector optical portion includes a set of projection lenses.

14. The image-projection display of claim 1 wherein said projector optical portion includes a folding prism set.

15. The image-projection display of claim 1 wherein said imaging surface is defined by a transparent and at least partially reflective combiner member.

16. The image-projection display of claim 15 wherein said combiner member is curved along at least one axis.

17. The image-projection display of claim 16 wherein said combiner member is curved along a pair of orthogonal axes.

18. The image-projection display of claim 15 wherein said combiner member is formed by a visor of a safety helmet, said display including a housing attaching to an exterior surface of said helmet and housing said projector portion, said projector portion projecting said image onto an inner surface of said visor for reflection to a wearer of the helmet.

19. The image-projection display of claim 18 wherein said projector portion projects said image inwardly through a transparent portion of said visor and onto said inner surface of said visor for reflection to said wearer of the helmet.

20. A helmet-mounted display apparatus comprising:

a transparent visor/combiner module for attachment to a helmet in front of the face of a wearer of the helmet, said visor/combiner module being configured to both shield the eyes of said wearer from wind blast, and to provide the wearer of the helmet with a view outwardly therethrough, said visor/combiner also defining an inner surface forward of the eyes of the wearer of the helmet which is at least partially reflective to reflect to the helmet wearer an image projected onto said inner surface;

a projector module of said display securing to said helmet, including an image source and projection optics, and projecting said image onto said inner surface of said visor/combiner module for reflection to said wearer, said projector module and said visor/combiner module in conjunction including off-axis projection and/or reflection factors which result in a rectilinear projected image being seen by said wearer of the helmet with distortions which destroy the rectilinearity of the image, said image source and projection module including means for compensatorily distorting the image as projected so that said off-axis factors result in the image as seen by the helmet wearer having substantially restored rectilinearity, the projection module physically compensatorily distorting the image.

21. The helmet-mounted display apparatus of claim 20 wherein said means for compensatorily distorting said image as projected includes said image source having a physical configuration at least partially non-linear so that said rectilinear image is rendered by said image source as a non-rectilinear image supplied to said projection optics.

22. The helmet-mounted display apparatus of claim 21 wherein said image source includes a solid state image screen having a fixed number and location of pixel elements.

23. The helmet-mounted display apparatus of claim 22 wherein said solid state image screen has said pixel elements arranged in rows and columns.

24. The helmet-mounted display apparatus of claim 22 wherein said solid state image screen has an arcuate shape for one of the rows or columns of pixels of said image source.

25. The helmet-mounted display apparatus of claim 20 wherein said means for compensatorily distorting said image as projected includes said image source including a fiber optic corrector element with a multitude of optical fibers extending therethrough and cooperatively defining opposite faces of said corrector element.

26. The helmet-mounted display apparatus of claim 25 wherein said fiber optic corrector element includes a face which is rectilinear with respect to the arrangement of the multiple optical fibers defining said face, and an opposite face which is non-rectilinear with respect to the arrangement of the multiple optical fibers defining said opposite face.

27. The helmet-mounted display apparatus of claim 26 wherein said fiber optic corrector element includes a pair of opposite faces each receiving respective ends of the multitude of optical fibers, one face of said pair of opposite faces having a selected pattern of said multitude of optical fibers, and the other face of said pair of opposite faces having a selectively different pattern of said multitude of optical fibers so that pixel image elements are selectively dislocated between said pair of opposite faces.

28. An image-projection display which includes an image projector projecting light to form an image, and means defining an imaging surface from which at least a portion of said light is reflected to be viewed as an image by a user of the display, said display including off-axis projection factors distorting a rectilinear projected image so that the user of the display would perceive an image with distorted rectilinearity, and the projector portion providing a projected image with compensatory image distortion so that the user of the display sees an image with substantially restored rectilinearity, said image-projection display comprising:

an image source for receiving a rectilinear image signal and providing a first image in response thereto;

a projector optical portion for receiving said first image from said image source and for providing a second image with said compensatory image distortion, said projector portion projecting said compensatorily-distorted second image to said imaging surface; and means for physically dislocating selected image elements (pixels) of one of said first image or said second image to compensatorily distort said second image, wherein said projector optical portion includes a folding prism set.

29. The image-projection display of claim 28 wherein said imaging surface is defined by a transparent and at least partially reflective combiner member.

30. The image-projection display of claim 29 wherein said combiner member is curved along at least one axis.

31. The image-projection display of claim 30 wherein said combiner member is curved along a pair of orthogonal axes.

32. The image-projection display of claim 29 wherein said combiner member is formed by a visor of a safety helmet, said display including a housing attaching to an exterior surface of said helmet and housing said projector portion, said projector portion projecting said image onto an inner surface of said visor for reflection to a wearer of the helmet.

33. The image-projection display of claim 32 wherein said projector portion projects said image inwardly through a transparent portion of said visor and onto said inner surface of said visor for reflection to said wearer of the helmet.

* * * * *